(12) United States Patent
Naito et al.

(10) Patent No.: US 11,393,667 B2
(45) Date of Patent: Jul. 19, 2022

(54) SAMPLE SUPPORT BODY AND PRODUCTION METHOD FOR SAMPLE SUPPORT BODY

(71) Applicant: Hamamatsu Photonics K.K., Hamamatsu (JP)

(72) Inventors: Yasuhide Naito, Hamamatsu (JP); Takayuki Ohmura, Hamamatsu (JP); Masahiro Kotani, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 169 days.

(21) Appl. No.: 16/967,046

(22) PCT Filed: Jan. 8, 2019

(86) PCT No.: PCT/JP2019/000223
§ 371 (c)(1),
(2) Date: Aug. 3, 2020

(87) PCT Pub. No.: WO2019/155803
PCT Pub. Date: Aug. 15, 2019

(65) Prior Publication Data
US 2021/0033564 A1 Feb. 4, 2021

(30) Foreign Application Priority Data
Feb. 9, 2018 (JP) .............................. JP2018-021900

(51) Int. Cl.
*H01J 49/04* (2006.01)
*G01N 27/62* (2021.01)
*H01J 49/16* (2006.01)

(52) U.S. Cl.
CPC .......... *H01J 49/0418* (2013.01); *G01N 27/62* (2013.01); *H01J 49/164* (2013.01)

(58) Field of Classification Search
CPC .................................................. H01J 49/0418
See application file for complete search history.

(56) References Cited

U.S. PATENT DOCUMENTS

| 2008/0203291 A1 | 8/2008 | Wagner et al. |
| 2009/0297696 A1 | 12/2009 | Pore et al. |
| 2013/0146758 A1* | 6/2013 | Urban .............. H01J 49/26 250/281 |

FOREIGN PATENT DOCUMENTS

| EP | 2112680 A2 | 10/2009 |
| EP | 3214437 A1 | 9/2017 |

(Continued)

OTHER PUBLICATIONS

K. W. Bewig et al., "The Wetting of Gold and Platinum by Water", The Journal of Physical Chemistry, vol. 69, No. 12, Dec. 1, 1965, p. 4238-p. 4242, XP055843895.

(Continued)

*Primary Examiner* — Eliza W Osenbaugh-Stewart
(74) *Attorney, Agent, or Firm* — Faegre Drinker Biddle & Reath LLP

(57) ABSTRACT

A sample support body includes: a substrate having a first surface and a second surface opposite to each other; and a conductive layer provided on at least the first surface. A plurality of through-holes, which open to the second surface and to a third surface of the conductive layer which is locate at a side opposite to the substrate, are provided in the substrate and the conductive layer. A protective film having a higher affinity with water than the substrate is provided on the second surface, the third surface, and each inner surface of the plurality of through-holes.

11 Claims, 12 Drawing Sheets

(56) References Cited

FOREIGN PATENT DOCUMENTS

| JP | 2002-543440 | A | | 12/2002 | | |
|----|----|----|----|----|----|----|
| JP | 2004-184137 | A | | 7/2004 | | |
| JP | 2004-347524 | A | | 12/2004 | | |
| JP | 2007-524810 | A | | 8/2007 | | |
| JP | 5438330 | B2 | | 3/2014 | | |
| JP | 6093492 | B1 | | 3/2017 | | |
| WO | WO-2000/067293 | A1 | | 11/2000 | | |
| WO | WO-2005/029003 | A2 | | 3/2005 | | |
| WO | WO-2007022026 | A2 | * | 2/2007 | ......... | B01L 3/50255 |
| WO | WO-2017/038710 | A1 | | 3/2017 | | |

OTHER PUBLICATIONS

Ievgen Kurylo et al., "Comparison of Ti-Based Coatings on Silicon Nanowires for Phosphopeptide Enrichment and Their Laser Assisted Desorption/Ionization Mass Spectrometry Detection", Nanomaterials, vol. 7, No. 9, Sep. 15, 2017, p. 272, XP055630403.

Sinha Soumyadeep et al., "ZnO as transparent conducting oxide by Atomic Layer Deposition", 2013 IEEE 39th Photovoltaic Specialists Coference (PVSC), IEEE, Jun. 16, 2013, p. 1183-p. 1186, XP032568729.

International Preliminary Report on Patentability dated Aug. 20, 2020 for PCT/JP2019/000223.

I. Kurylo et al., "Comparison of Ti-Based Coatings on Silicon Nanowires for Phosphopeptide Enrichment and Their Laser Assisted Desorption/Ionization Mass Spectrometry Detection", Nanomaterials, Sep. 15, 2017, vol. 7, p. 1-p. 17.

\* cited by examiner

Fig.12
(a)
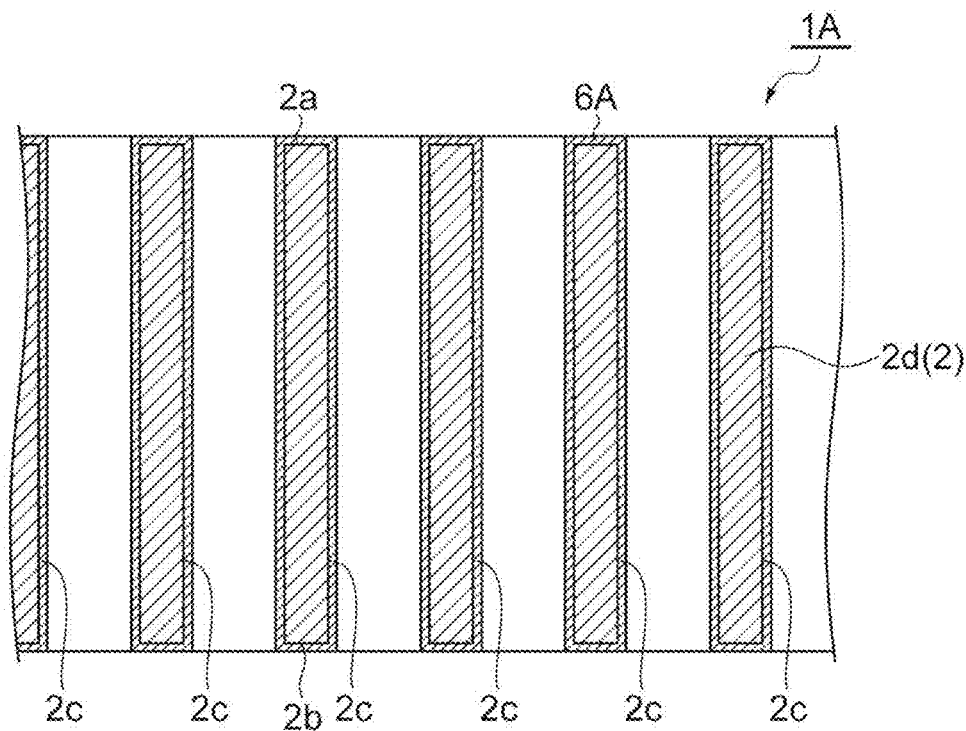
(b)
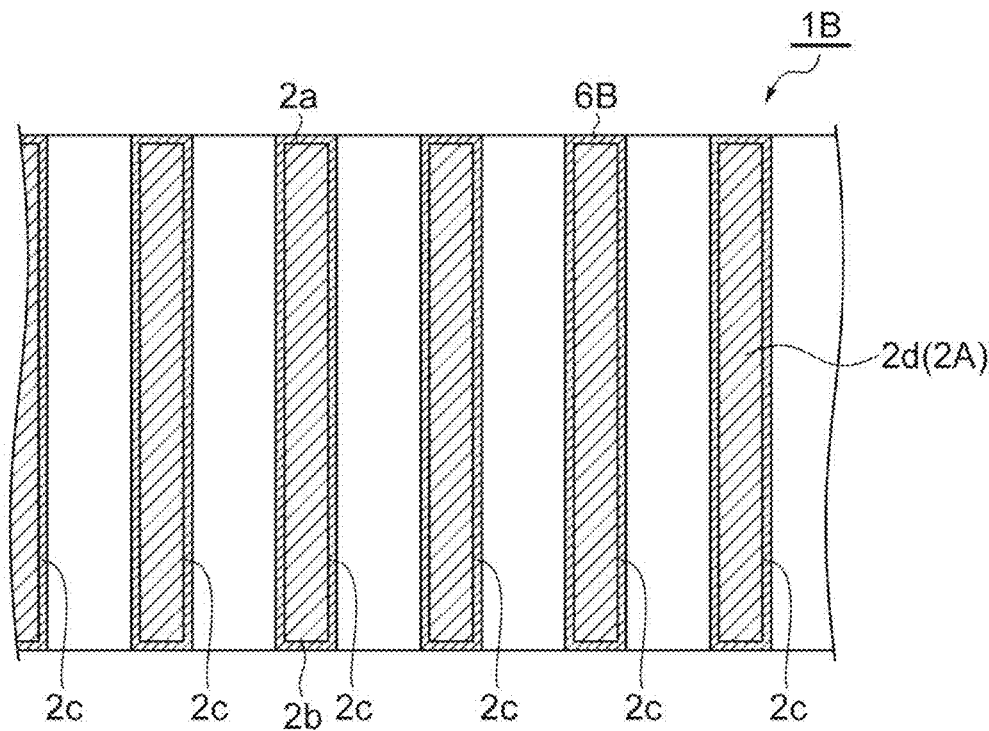

SAMPLE SUPPORT BODY AND PRODUCTION METHOD FOR SAMPLE SUPPORT BODY

TECHNICAL FIELD

The present disclosure relates to a sample support body and a production method for the sample support body.

BACKGROUND ART

Conventionally, a sample support body for ionizing a sample in mass spectrometry of a sample such as a biological sample is known (e.g., see Patent Literature 1). This sample support body includes a substrate formed with a plurality of through-holes opening to a first surface and a second surface opposite to each other.

CITATION LIST

Patent Literature

Patent Literature 1: Japanese Patent No. 6093492

SUMMARY OF INVENTION

Technical Problem

In the mass spectrometry as described above, the ionized sample (sample ions) is detected, and the mass spectrometry of the sample is performed on the basis of the detection result. In this mass spectrometry, an improvement in signal intensity (sensitivity) is desired.

Therefore, the present disclosure is directed to providing a sample support body capable of improving signal intensity of sample ions, and a production method for the sample support body.

Solution to Problem

A sample support body relating to a first aspect of the present disclosure is for ionization of a sample, and includes: a substrate having a first surface and a second surface opposite to each other; and a conductive layer provided on at least the first surface. A plurality of through-holes, which open to the second surface and a third surface of the conductive layer which is located at a side opposite to the substrate, are formed in the substrate and the conductive layer, and a protective film having a higher affinity with water than the substrate is provided on the second surface, the third surface, and each inner surface of the plurality of through-holes.

The sample support body relating to the first aspect includes the substrate formed with the plurality of through-holes opening to the second surface and the third surface. For example, in a state in which components of the sample to be measured enter into the plurality of through-holes of the substrate due to a capillary phenomenon, a laser beam is applied to the first surface of the substrate. Thus, energy of the laser beam is transmitted to the components of the sample via the conductive layer, and the components of the sample are ionized. Here, from earnest researches of the inventors of the disclosure, it has been obtained a knowledge that signal intensity of the ionized sample (the sample ions) is increased by leaving the components of the sample in the through-holes as much as possible. Therefore, in the sample support body according to the first aspect, the protective film having a higher affinity with water than the substrate is provided on the second surface of the substrate, the third surface of the conductive layer, and each inner surface of the plurality of through-holes. This protective film is provided, and thus circulation of the components of the sample from openings of the through-holes at the side of the second surface and openings of the through-holes at the side of the third surface into the through-holes can be accelerated, and the components of the sample can be easy to enter into the through-holes. As a result, the components of the sample can be easily left in the through-holes, and the signal intensity of the sample ions can be improved.

The protective film may be formed by forming a film of titanium oxide or zinc oxide. In this case, the hydrophilic protective film capable of accelerating the circulation of the components of the sample into the through-holes is appropriately realized.

The substrate may be formed by anodizing a valve metal or silicon. In this case, movement of the components of the sample due to a capillary phenomenon can be appropriately realized by the substrate obtained by anodizing a valve metal or silicon.

Widths of the through-holes may be 1 nm to 700 nm. In this case, the movement of the components of the sample due to the aforementioned capillary phenomenon can be appropriately realized.

A material of the conductive layer may be platinum or gold. In this case, a constant voltage can be easily and stably applied to the conductive layer.

A sample support body relating to a second aspect of the present disclosure is for ionization of a sample, and includes: a substrate formed with a plurality of through-holes opening to a first surface and a second surface opposite to each other; and a protective film provided on the first surface, the second surface, and each inner surface of the plurality of through-holes. The protective film is formed by forming a film of conductive titanium oxide or conductive zinc oxide.

In the sample support body relating to the second aspect, the protective film formed of conductive titanium oxide or conductive zinc oxide exhibits functions of both the conductive layer and the protective film in the sample support body relating to the aforementioned first aspect. Therefore, according to the sample support body relating to the second aspect, the same effects as the aforementioned sample support body can be produced, and a configuration of the sample support body can be simplified by omitting the conductive layer.

A sample support body relating to a third aspect of the present disclosure is for ionization of a sample, and includes a substrate which has conductivity and is formed with a plurality of through-holes opening to a first surface and a second surface opposite to each other. A protective film having a higher affinity with water than the substrate is provided on the first surface, the second surface, and each inner surface of the plurality of through-holes.

In the sample support body relating to the third aspect, the substrate having conductivity is adopted, and thus the conductive layer of the sample support body relating to the first aspect is omitted. Therefore, according to the sample support body relating to the third aspect, the same effects as the aforementioned sample support body relating to the aforementioned first aspect can be produced, and a configuration of the sample support body can be simplified by omitting the conductive layer A production method for the sample support body relating to the first aspect of the present disclosure is a production method for a sample support body for ionization of a sample, and includes: a first step of preparing a substrate having a first surface and a second surface opposite to each other and a conductive layer provided on at least the first surface, wherein a plurality of through-holes, which open to the second surface and a third surface of the conductive layer which is located on a side opposite to the substrate, are formed in the substrate and the conductive layer; and a second step of providing a protective film having a higher affinity with water than the substrate on the second surface, the third surface, and each inner surface of the plurality of through-holes.

According to the production method, the sample support body relating to the aforementioned first aspect can be obtained.

The protective film may be formed by forming a film of titanium oxide or zinc oxide using an atomic layer deposition method. In this case, the hydrophilic protective film capable of accelerating the circulation of the components of the sample into the through-holes can be appropriately and easily formed.

A production method for the sample support body relating to the second aspect of the present disclosure is a production method for a sample support body for ionization of a sample, and includes: a first step of preparing a substrate formed with a plurality of through-holes opening to a first surface and a second surface opposite to each other; and a second step of providing a protective film on the first surface, the second surface, and each inner surface of the plurality of through-holes by forming a film of conductive titanium oxide or conductive zinc oxide.

According to the production method, the sample support body relating to the aforementioned second aspect can be obtained.

A production method for the sample support body relating to the third aspect of the present disclosure is a production method for a sample support body for ionization of a sample, and includes: a first step of preparing a substrate which has conductivity and is formed with a plurality of through-holes opening to a first surface and a second surface opposite to each other; and a second step of providing a protective film having a higher affinity with water than the substrate on the first surface, the second surface, and each inner surface of the plurality of through-holes.

According to the production method, the sample support body relating to the aforementioned third aspect can be obtained.

Advantageous Effects of Invention

According to the present disclosure, a sample support body capable of improving signal intensity of sample ions, and a production method for the sample support body can be provided.

BRIEF DESCRIPTION OF DRAWINGS

FIG. 12 is an enlarged sectional view of key parts of the sample support body according to second and third embodiments.

DESCRIPTION OF EMBODIMENTS

Figure 1:
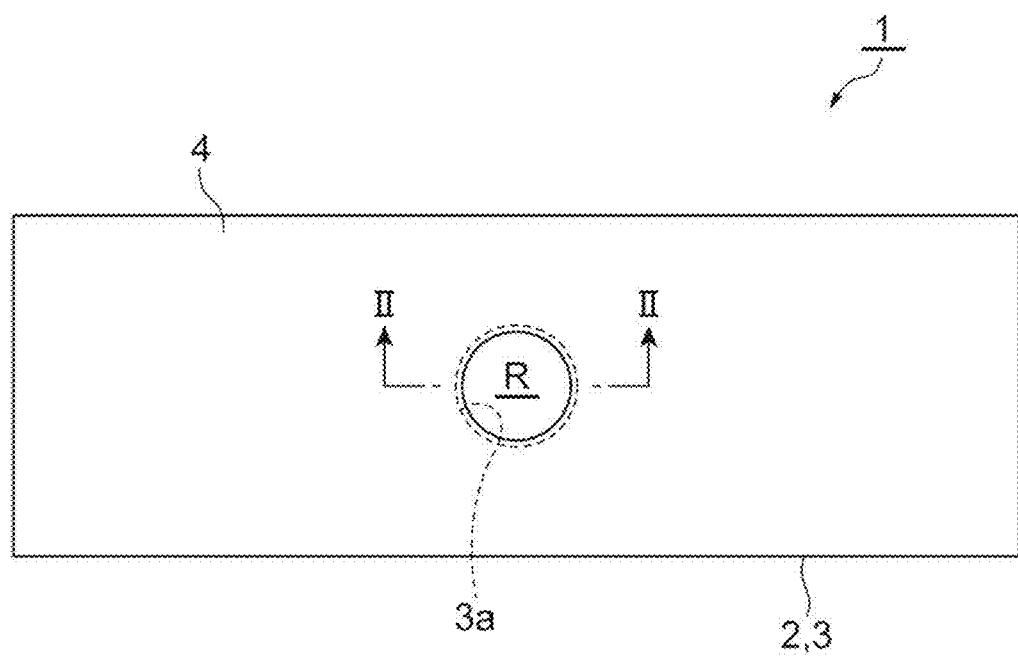
FIG. 1 is a plan view of a sample support body according to a first embodiment.

Hereinafter, embodiments of the present disclosure will be described in detail with reference to the drawings. Note that the same or equivalent portions are denoted by the same reference signs in each of the drawings, and duplicate descriptions thereof will be omitted. Further, dimensions of each member (or each region) illustrated in the drawings or a ratio of the dimensions may be different from actual dimensions or a ratio of the actual dimensions in order to facilitate an understanding of the description.

Configuration of Sample Support Body According to First Embodiment

Figure 2:
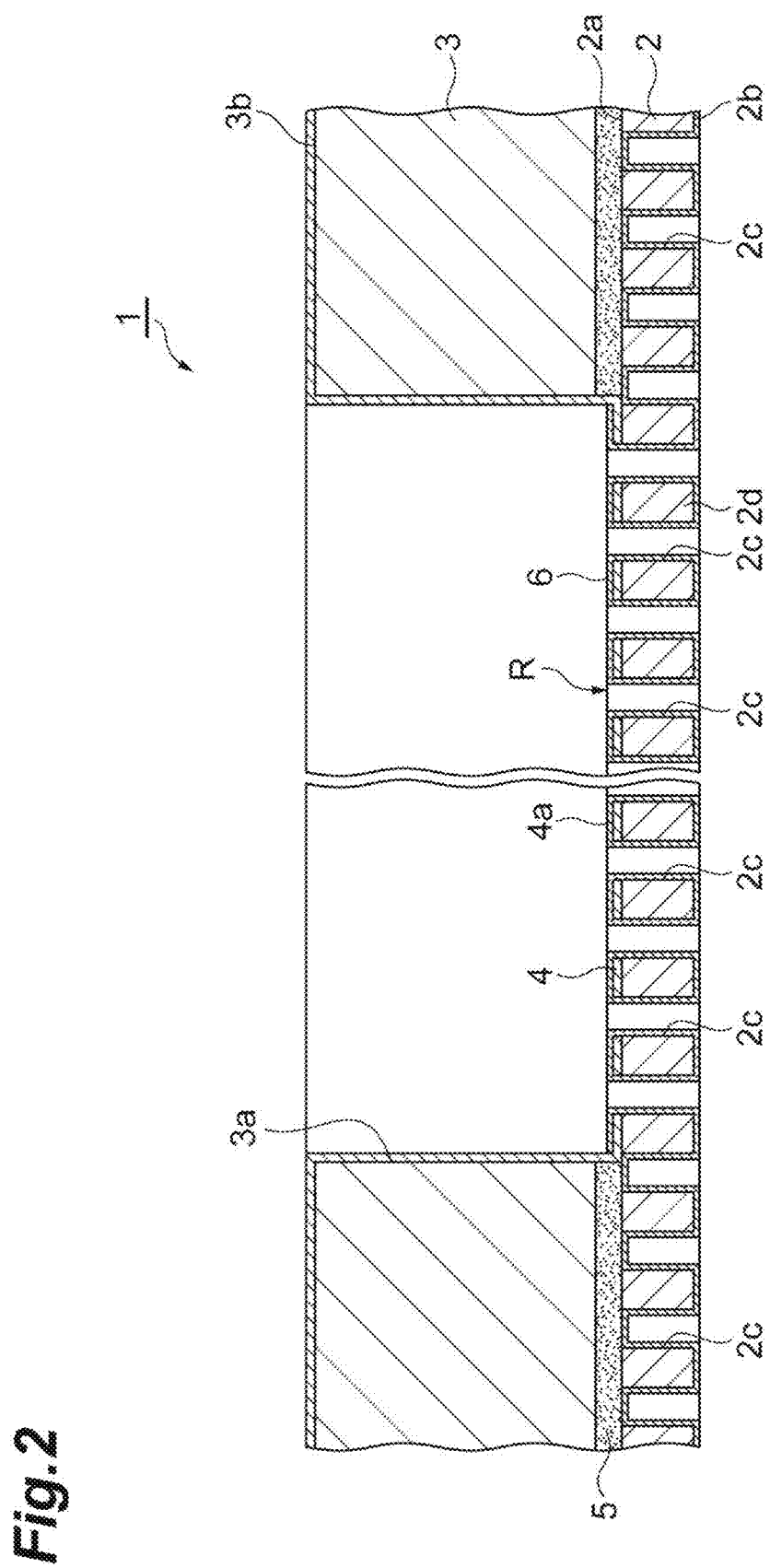
FIG. 2 is a sectional view of the sample support body along line II-II illustrated in FIG. 1.

As illustrated in FIGS. 1 and 2, a sample support body 1 according to a first embodiment includes a substrate 2, a frame 3, and a conductive layer 4. The sample support body 1 is for ionization of a sample. For example, when mass spectrometry is performed, the sample support body 1 is used to ionize components of a sample to be measured. The substrate 2 has a first surface 2a and a second surface 2b opposite to each other. A plurality of through-holes 2c are formed in the substrate 2 in a uniform manner (with uniform distribution). Each of the through-holes 2c extends in a thickness direction of the substrate 2 (a direction perpendicular to the first surface 2a and the second surface 2b), and opens to the first surface 2a and the second surface 2b.

The substrate 2 is formed of, for instance, an insulating material in the shape of a rectangular plate. When viewed in the thickness direction of the substrate 2, a length of one side of the substrate 2 is, for instance, several centimeters or so, and a thickness of the substrate 2 is, for instance, about 1 μm to 50 μm. When viewed in the thickness direction of the substrate 2, shapes of the through-holes 2c are, for instance, nearly circular shapes. Width of the through-hole 2c is, for instance, about 1 nm to 700 nm. The width of the through-hole 2c is a diameter of the through-hole 2c in a case where, when viewed in the thickness direction of the substrate 2, the shape of the through-hole 2c is the nearly circular shape, and is a diameter (effective diameter) of virtual maximum column fitted into the through-hole 2c in a case where the shape is other than the nearly circular shape.

The frame 3 is provided on the first surface 2a of the substrate 2. To be specific, the frame 3 is fixed to the first surface 2a of the substrate 2 by an adhesive layer 5. As a material of the adhesive layer 5, an adhesion material (e.g., a low melting point glass, an adhesive for vacuum, etc.) having little discharge gas is preferably used. When viewed in the thickness direction of the substrate 2, the frame 3 has nearly the same outline as the substrate 2. An opening 3a is formed in the frame 3. A portion of the substrate 2 which corresponds to the opening 3a functions as an effective region R for moving components of a sample toward the first surface 2a by means of a capillary phenomenon (to be described below).

The frame 3 is formed of, for instance, an insulating material in the shape of a rectangular plate. When viewed in the thickness direction of the substrate 2, a length of one side of the frame 3 is, for instance, several centimeters or so, and a thickness of the frame 3 is, for instance, 1 mm or less. When viewed in the thickness direction of the substrate 2, a shape of the opening 3a is, for instance, a circular shape. In that case, a diameter of the opening 3a is, for instance, about several millimeters to tens of millimeters. Due to this frame 3, handling of the sample support body 1 is facilitated, and deformation of the substrate 2 caused by, for instance, a change in temperature is curbed.

The conductive layer 4 is provided on the first surface 2a of the substrate 2. To be specific, the conductive layer 4 is continuously (integrally) formed in a region of the first surface 2a of the substrate 2 which corresponds to the opening 3a of the frame 3 (i.e., a region corresponding to the effective region R), an inner surface of the opening 3a, and a surface 3b of the frame 3 which is located on the side opposite to the substrate 2. The conductive layer 4 covers a portion of the first surface 2a of the substrate 2 at which the through-holes 2c are not formed in the effective region R. That is, openings of the through-holes 2c at the side of the conductive layer 4 are not blocked by the conductive layer 4. That is, the through-holes 2c open to the second surface 2b and a third surface 4a of the conductive layer 4 which is located on the side opposite to the substrate 2, and the through-holes 2c are exposed to the opening 3a in the effective region R.

The conductive layer 4 is formed of a conductive material. As a material of the conductive layer 4, for the reason to be described below, a metal having a low affinity (reactivity) with a sample and high conductivity is preferably used.

For example, if the conductive layer 4 is formed of a metal such as copper (Cu) that has a high affinity with a sample such as a protein, the sample is ionized in a state in which Cu atoms are attached to sample molecules in a process (to be described below) of ionizing the sample, and detection results are likely to deviate by an attached amount of the Cu atoms in a mass spectrometry method (to be described below). Therefore, as the material of the conductive layer 4, a metal having a low affinity with a sample is preferably used.

Meanwhile, a constant voltage is easily applied to a metal having higher conductivity in an easy and stable way. For this reason, if the conductive layer 4 is formed of a high-conductivity metal, a voltage can be uniformly applied to the first surface 2a of the substrate 2 in the effective region R. Further, a metal having higher conductivity also shows a tendency to have higher thermal conductivity. For this reason, if the conductive layer 4 is formed of a high-conductivity metal, energy of a laser beam applied to the substrate 2 can be efficiently transmitted to a sample via the conductive layer 4. Therefore, as the material of the conductive layer 4, a high-conductivity metal is preferably used.

In view of the above, for example, gold (Au), platinum (Pt), or the like is used as the material of the conductive layer 4. For example, the conductive layer 4 is formed at a thickness of about 1 nm to 350 nm using a plating method, an atomic layer deposition (ALD) method, a vapor deposition method, a sputtering method, or the like. For example, chromium (Cr), nickel (Ni), titanium (Ti), or the like may be used as the material of the conductive layer 4.

In a region corresponding to the effective region R, a protective film 6 having a higher affinity with water than the substrate 2 is provided on the second surface 2b of the substrate 2, the third surface 4a of the conductive layer 4, and each inner surface of the plurality of through-holes 2c (i.e., a lateral surface of a partition portion 2d between the neighboring through-holes 2c). The protective film 6 is continuously (integrally) formed on the second surface 2b of the substrate 2, the third surface 4a of the conductive layer 4, and each inner surface of the plurality of through-holes 2c. In the present embodiment, the protective film 6 is continuously (integrally) formed on the second surface 2b, each inner surface of the plurality of through-holes 2c, and a surface of the adhesive layer 5 which is located on the side opposite to the frame 3 in the region not corresponding to the effective region R (i.e., a region overlapping the frame 3 when viewed in the thickness direction of the substrate 2). However, the protective film 6 may be provided only in the region corresponding to the effective region R. Alternatively, the protective film 6 may be provided to cover entire surfaces of the substrate 2 and the frame 3 (a surface of the conductive layer 4 in regard to a portion at which the conductive layer 4 is provided).

The protective film 6 is formed, for instance, by forming a film of titanium oxide ($TiO_2$) or zinc oxide (ZnO). The protective film 6 is formed, for instance, by an atomic layer deposition method. A thickness of the protective film 6 is, for instance, 1 nm to 50 nm.

Figure 3:
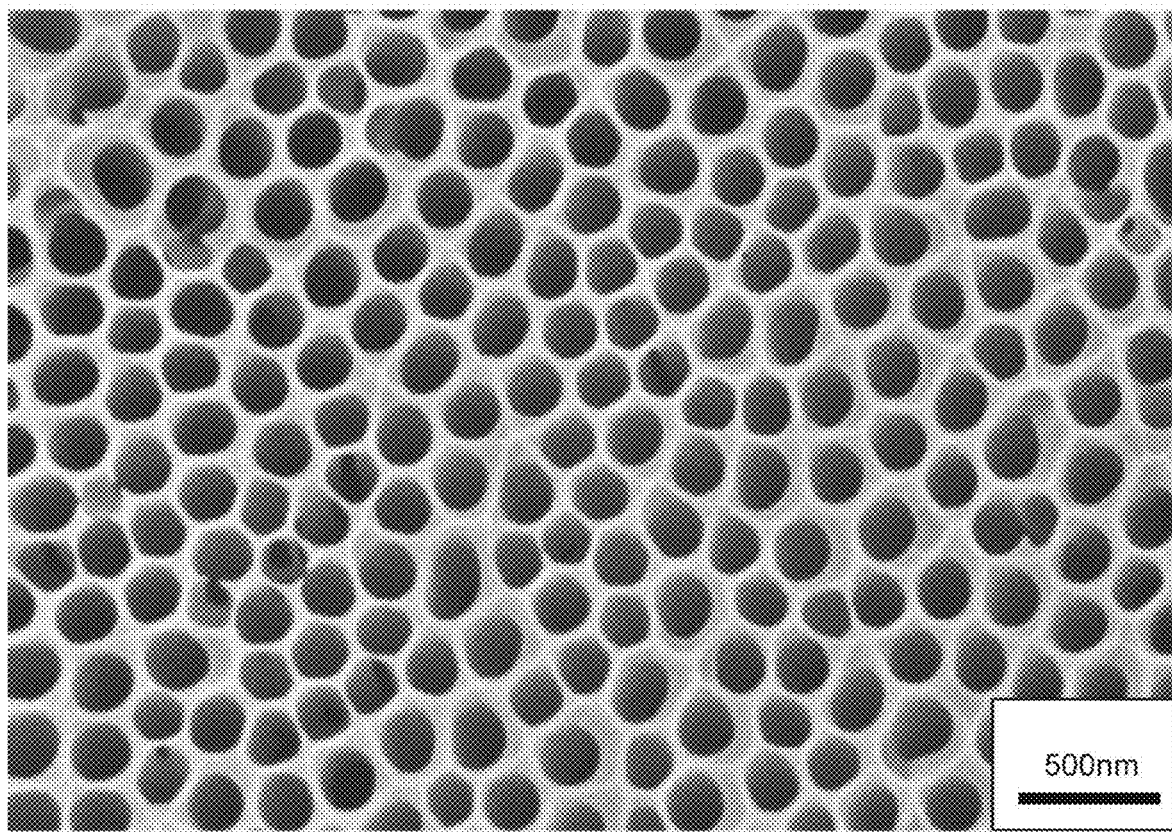
FIG. 3 is a view illustrating an enlarged image of a substrate of the sample support body illustrated in FIG. 1.

FIG. 3 is a view illustrating an enlarged image of the substrate 2 when viewed in the thickness direction of the substrate 2. In FIG. 3, black portions are the through-holes 2c, and white portions are the partition portions 2d. As illustrated in FIG. 3, the plurality of through-holes 2c having approximately constant widths are uniformly formed in the substrate 2. An aperture ratio of the through-holes 2c in the effective region R (a ratio of all the through-holes 2c to the effective region R when viewed in the thickness direction of the substrate 2) ranges from 10% to 80% in view of practical use, and particularly preferably ranges from 60% to 80%. The sizes of the plurality of through-holes 2c may not be even with one another, and the plurality of through-holes 2c may be partly coupled to one another.

The substrate 2 illustrated in FIG. 3 is an alumina porous film formed by anodizing aluminum (Al). For example, by performing anodizing treatment on an Al substrate, a surface portion of the Al substrate is oxidized, and a plurality of pores (intended portions that become the through-holes 2c) are formed in the surface portion of the Al substrate. Next, the oxidized surface portion (the anodized film) is peeled from the Al substrate, and pore widening treatment that widens widths of the pores is performed on the peeled anodized film, and thus the aforementioned substrate 2 is obtained. The substrate 2 may be formed by anodizing a valve metal other than Al such as tantalum (Ta), niobium (Nb), titanium (Ti), hafnium (Hf), zirconium (Zr), zinc (Zn), tungsten (W), bismuth (Bi), antimony (Sb), or the like, or by anodizing silicon (Si).

Production Method for the Sample Support Body
According to the First Embodiment

Figure 4:
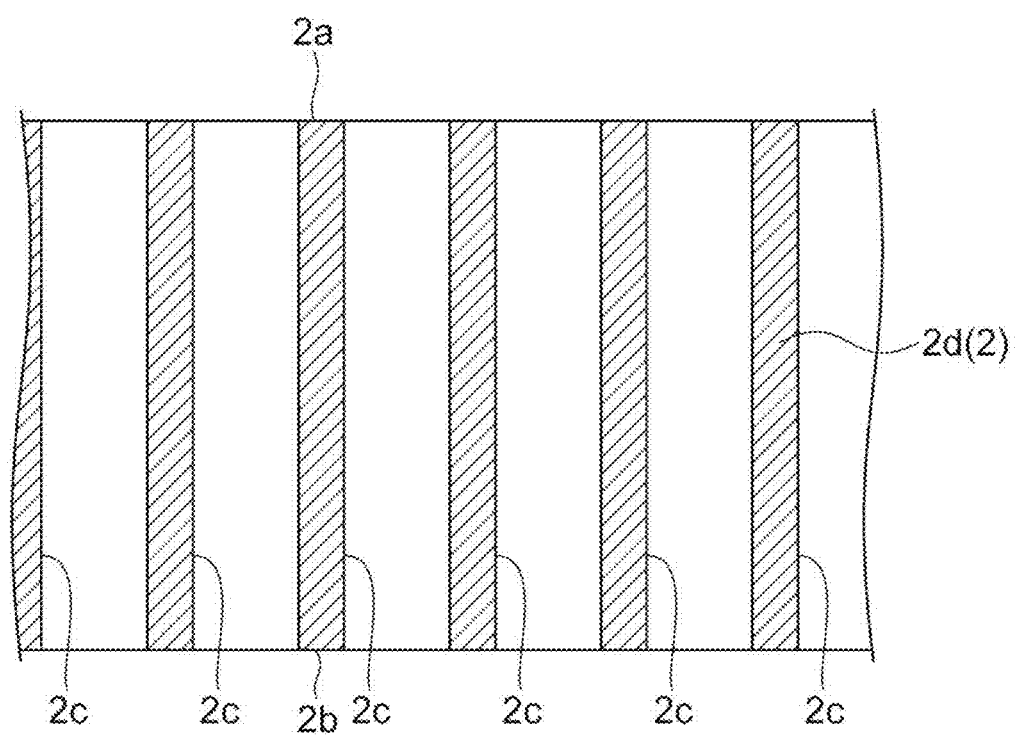
FIG. 4 is a view illustrating a process of a production method for the sample support body illustrated in FIG. 1.
Figure 5:
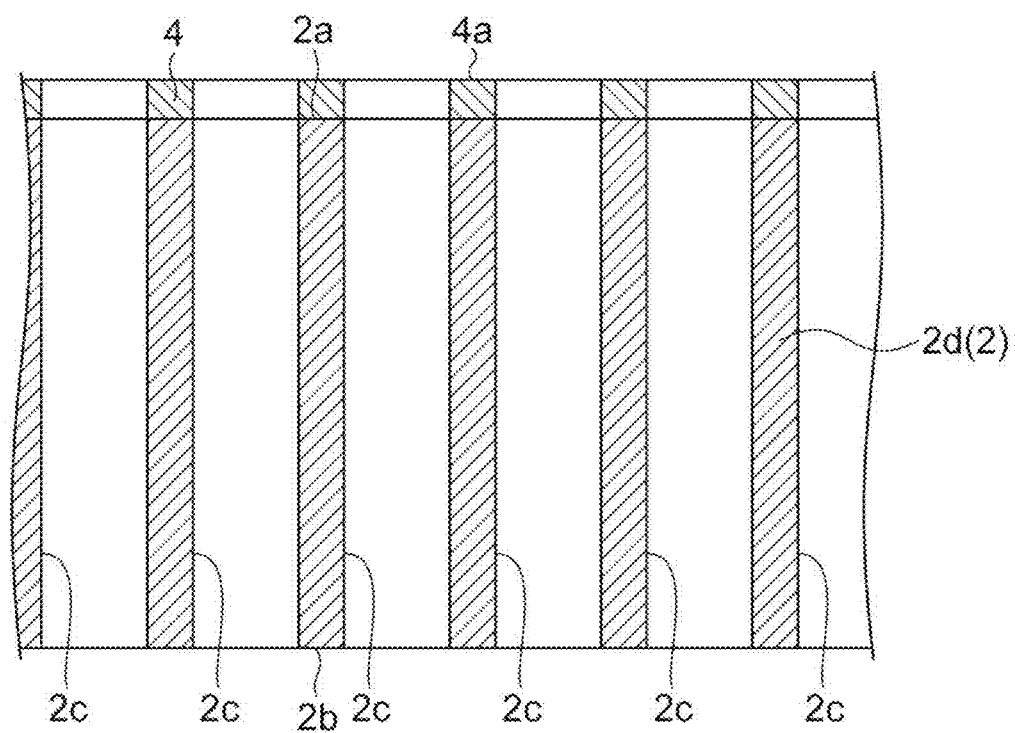
FIG. 5 is a view illustrating a process of the production method for the sample support body illustrated in FIG. 1.
Figure 6:
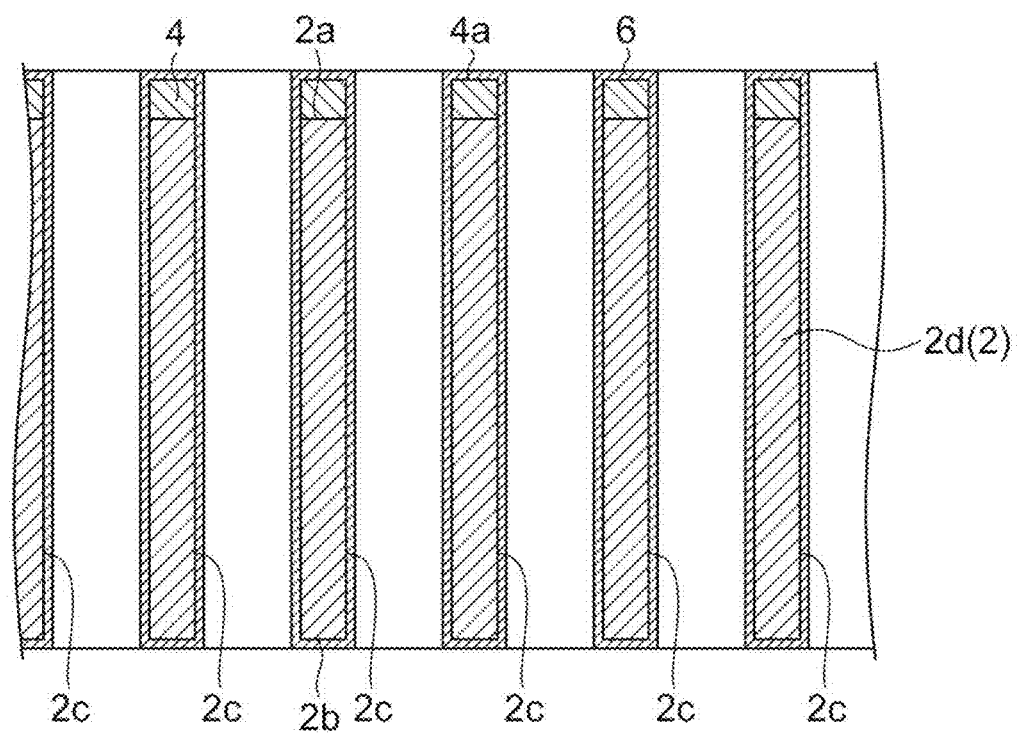
FIG. 6 is a view illustrating a process of the production method for the sample support body illustrated in FIG. 1.

Next, a production method for the sample support body 1 will be described with reference to FIGS. 2 and 4 to 6. Each of FIGS. 4 to 6 is an enlarged sectional view of the portion corresponding to the effective region R. First, as illustrated in FIG. 4, the substrate 2 formed with the plurality of through-holes 2c opening to the first surface 2a and the second surface 2b opposite to each other is prepared. The substrate 2 is obtained, for instance, by anodizing a valve metal or silicon as described above.

Next, as illustrated in FIG. 5, the substrate 2 and the conductive layer 4 (i.e. a structure in which the conductive layer 4 is provided on the first surface 2a of the substrate 2) are prepared (a first step). In the present embodiment, after the frame 3 is fixed to the first surface 2a of the substrate 2 via the adhesive layer 5, the conductive layer 4 is continuously formed on a region of the first surface 2a of the substrate 2 which corresponds to an opening 3a of the frame 3 (i.e., a region that corresponds to the effective region R), an inner surface of the opening 3a, and a surface 3b of the frame 3 which is located on the side opposite to the substrate 2.

Next, as illustrated in FIG. 6, the protective film 6 having a higher affinity with water than the substrate 2 is provided on the second surface 2b, the third surface 4a, and each inner surface of the plurality of through-holes 2c (a second step). In the present embodiment, the protective film 6 is formed by forming a film of titanium oxide or zinc oxide using an atomic layer deposition method. From the above, the sample support body 1 illustrated in FIG. 2 is obtained.

Sample Ionization Method of Dropping Method

Figure 7:
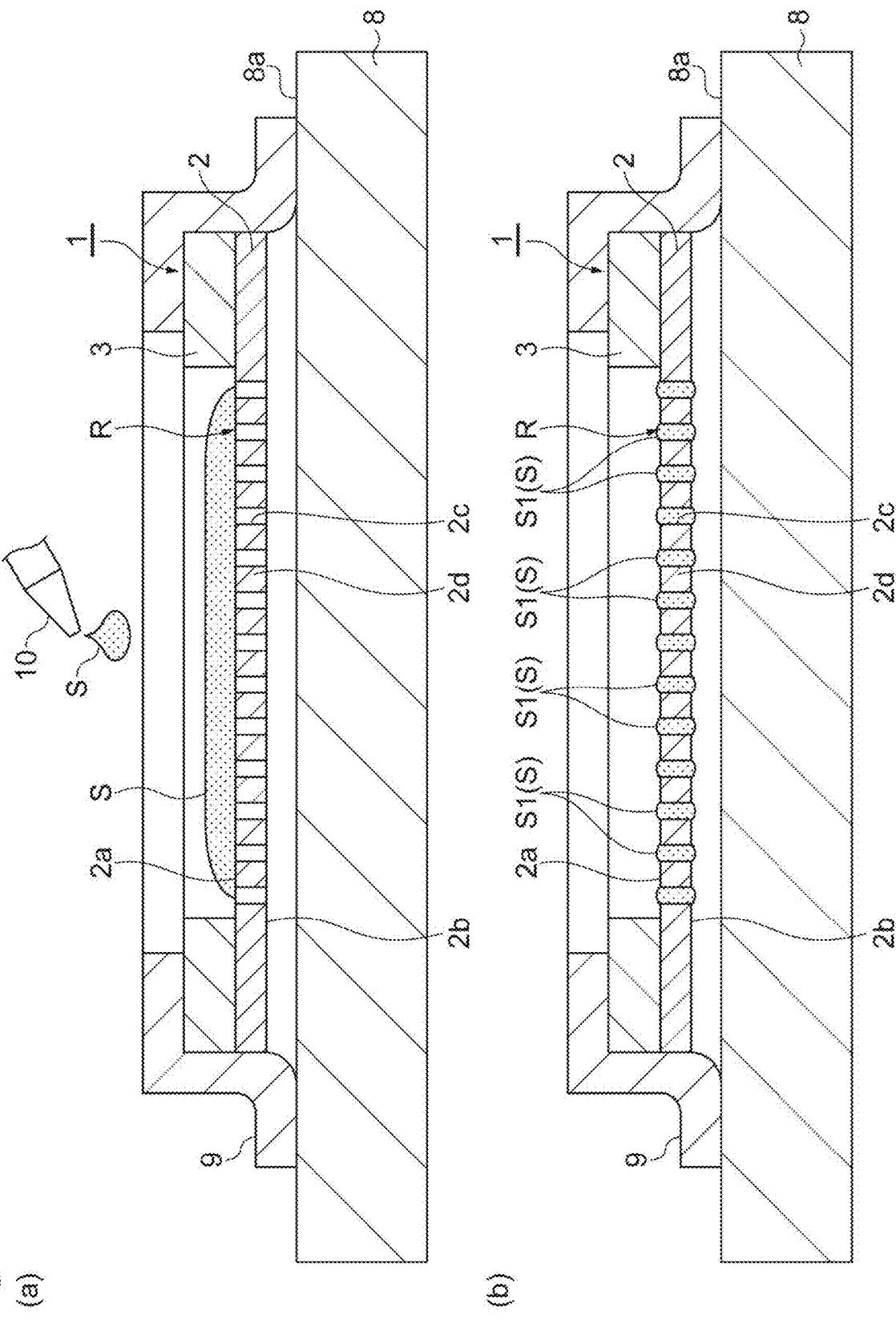
FIG. 7 is a view illustrating a process of a mass spectrometry method of a dropping method.
Figure 8:
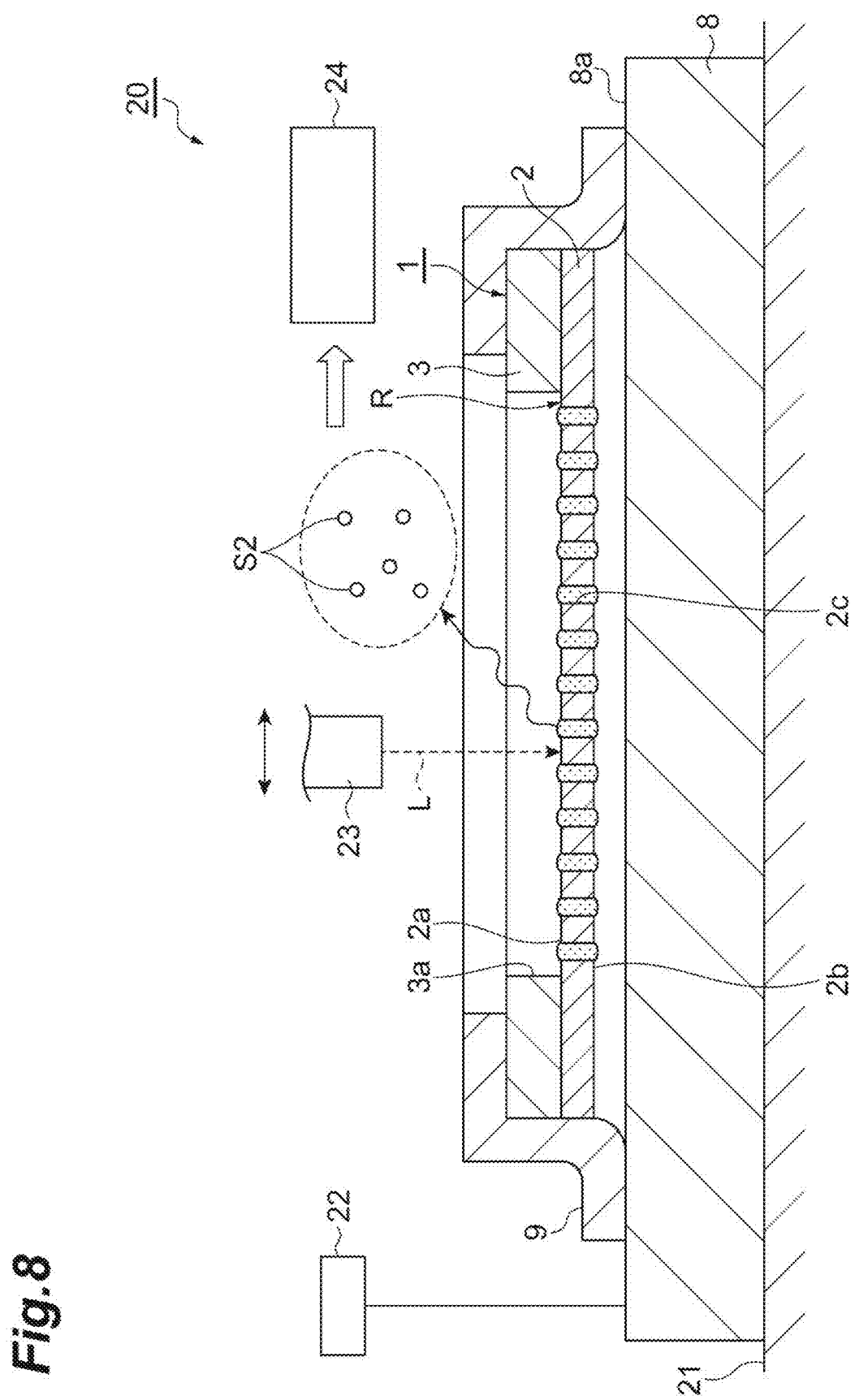
FIG. 8 is a view illustrating a process of the mass spectrometry method of the dropping method.

Next, a sample ionization method of a dropping method using the sample support body 1 will be described with reference to FIGS. 7 and 8. The dropping method is a measuring method that drops a solution including the sample S onto the third surface 4a of the sample support body 1. The sample support body 1 can be used in the sample ionization method of this dropping method. Here, as an example, a laser desorption/ionization method (a part of a mass spectrometry method using a mass spectrometer 20) using a laser beam as an energy beam applied for ionization of a sample will be described. In FIGS. 7 and 8, only the through-holes 2c corresponding to the effective region R among the plurality of through-holes 2c formed in the substrate 2 are schematically illustrated. Further, the conductive layer 4, the adhesive layer 5, and the protective film 6 are not illustrated in the sample support body 1. Further, for convenience of illustration, for instance ratios of dimensions are different in the sample support body 1 illustrated in FIGS. 1 and 2 and the sample support body 1 illustrated in FIGS. 7 and 8.

First, the aforementioned sample support body 1 is prepared (a first step). The sample support body 1 may be prepared by being manufactured by a person who carries out the laser desorption/ionization method and the mass spectrometry method, or be prepared by being obtained from a manufacturer or a seller of the sample support body 1.

Next, as illustrated in (a) of FIG. 7, the sample support body 1 is mounted on a mounting surface 8a of a slide glass (a mount) 8 such that the second surface 2b faces the mounting surface 8a (a second step). The slide glass 8 is a glass substrate on which a transparent conductive film such as an indium tin oxide (ITO) film is formed, and a surface of the transparent conductive film is the mounting surface 8a. Without being limited to the slide glass 8, a member capable of securing conductivity (e.g., a substrate formed of a metal material such as stainless steel, or the like) may be used as the mount. In the present embodiment, as an example, the sample support body 1 is fixed to the slide glass 8 by a conductive tape 9 (e.g., a carbon tape, or the like) such that a gap is provided between the second surface 2b and the mounting surface 8a of the slide glass 8. The gap can function, for instance, as a region for releasing some, which flows out of the side of the second surface 2b, of a solution including a sample S (to be described below). That is, the gap serves to prevent the solution from overflowing on the first surface 2a of the substrate 2 (on the third surface 4a of the conductive layer 4) to impede the ionization of the sample. Further, the tape 9 comes into contact with the conductive layer 4 on the surface 3b of the frame 3, and comes into contact with the mounting surface 8a of the slide glass 8, and thus the sample support body 1 is fixed to the slide glass 8. The tape 9 may be a part of the sample support body 1, and be prepared separately from the sample support body 1. In a case where the tape 9 is a part of the sample support body 1 (i.e. in a case where the sample support body 1 includes the tape 9), the tape 9, for instance, may be fixed to the side of the first surface 2a at a circumferential edge of the substrate 2 in advance. In the present embodiment, the tape 9 may be fixed on the conductive layer 4 formed on the surface 3b of the frame 3.

Next, as illustrated in (b) of FIG. 7, the solution including the sample S is dropped by a pipette 10 to the plurality of through-holes 2c (the plurality of through-holes 2c corresponding to the effective region R) from the side of the third surface 4a (a third step). Thus, as illustrated in (b) of FIG. 7, the solution including the sample S enters from the opening of each through-hole 2c at the side of the third surface 4a into each through-hole 2c, and some of the solution including the sample S stays in each through-hole 2c.

Here, in the sample support body 1, the protective film 6 (see FIGS. 2 and 6) is provided, and thus circulation of components S1 of the sample S from the openings of the through-holes 2c at the side of the third surface 4a into the through-holes 2c is accelerated. That is, the solution including the sample S dropped onto the third surface 4a (onto the protective film 6) is easy to enter into each through-hole 2c along the hydrophilic protective film 6. That is, the protective film 6 serves to appropriately guide the solution at the side of the third surface 4a into each through-hole 2c. Thus, the components S1 of the sample S can be made to appropriately enter into each through-hole 2c.

Next, as illustrated in FIG. 8, in a state in which the sample support body 1 where the components S1 of the sample S stays in each through-hole 2c is fixed to the slide glass 8, the slide glass 8, the sample support body 1, and the sample S are mounted on a support 21 (e.g., a stage) of the mass spectrometer 20. Next, a voltage is applied to the conductive layer 4 (see FIG. 2) of the sample support body 1 via the mounting surface 8a of the slide glass 8 and the tape 9 by a voltage application part 22 of the mass spectrometer 20. In the present embodiment, the conductive layer 4 and the tape 9 are conducted at a portion at which the protective film 6 is not provided (a portion of the conductive layer 4 provided on the frame 3). However, the conductive layer 4 and the tape 9 may be brought into contact via the protective film 6, for instance, in a case where the frame 3 is not provided. It is not a great obstacle to the conduction between the conductive layer 4 and the tape 9 because the protective film 6 is a very thin film.

Next, a laser beam L is applied to the first surface 2a of the substrate 2 (the third surface 4a of the conductive layer 4) via the opening 3a of the frame 3 by a laser beam application part 23 of the mass spectrometer 20. That is, the laser beam L is applied to a region of the first surface 2a of the substrate 2 (i.e., a region corresponding to the effective region R) which corresponds to the opening 3a of the frame 3. In the present embodiment, the laser beam application part 23 scans the laser beam L onto the region corresponding to the effective region R. At least one of the support 21 and the laser beam application part 23 is operated, and thus the scanning of the laser beam L onto the region corresponding to the effective region R can be performed.

In this way, the laser beam L is applied to the first surface 2a of the substrate 2 while a voltage is applied to the conductive layer 4. Thus, the components S1 of the sample S which stay in the through-holes 2c of the substrate 2 (especially, at the side of the first surface 2a) are ionized, and sample ions S2 (the ionized components S1) are discharged (a fourth step). To be specific, energy of the laser beam L is transmitted from the conductive layer 4 (see FIG. 2) absorbing the energy of the laser beam L to the components S1 of the sample S which stay in the through-holes 2c, and the components S1 of the sample S which obtain the energy are evaporated, and obtain electric charges to become the sample ions S2. The above first to fourth steps are equivalent to the ionization method (here, the laser desorption/ionization method) of the sample S using the sample support body 1. The protective film 6 is provided on the third surface 4a of the conductive layer 4, but the protective film 6 is a very thin film as described above, and is not a great obstacle in applying the laser beam L to the conductive layer 4.

The discharged sample ions S2 move while being accelerated toward a ground electrode (not illustrated) provided between the sample support body 1 and an ion detector 24 of the mass spectrometer 20. That is, the sample ions S2 move while being accelerated toward the ground electrode by a potential difference generated between the conductive layer 4 to which a voltage is applied and the ground electrode. The sample ions S2 are detected by the ion detector 24 (a fifth step). In the present embodiment, the mass spectrometer 20 is a scanning mass spectrometer using time-of-flight mass spectrometry (TOF-MS). The above first to fifth steps are equivalent to the mass spectrometry method using the sample support body 1.

Sample Ionization Method of Sucking Method

Figure 9:
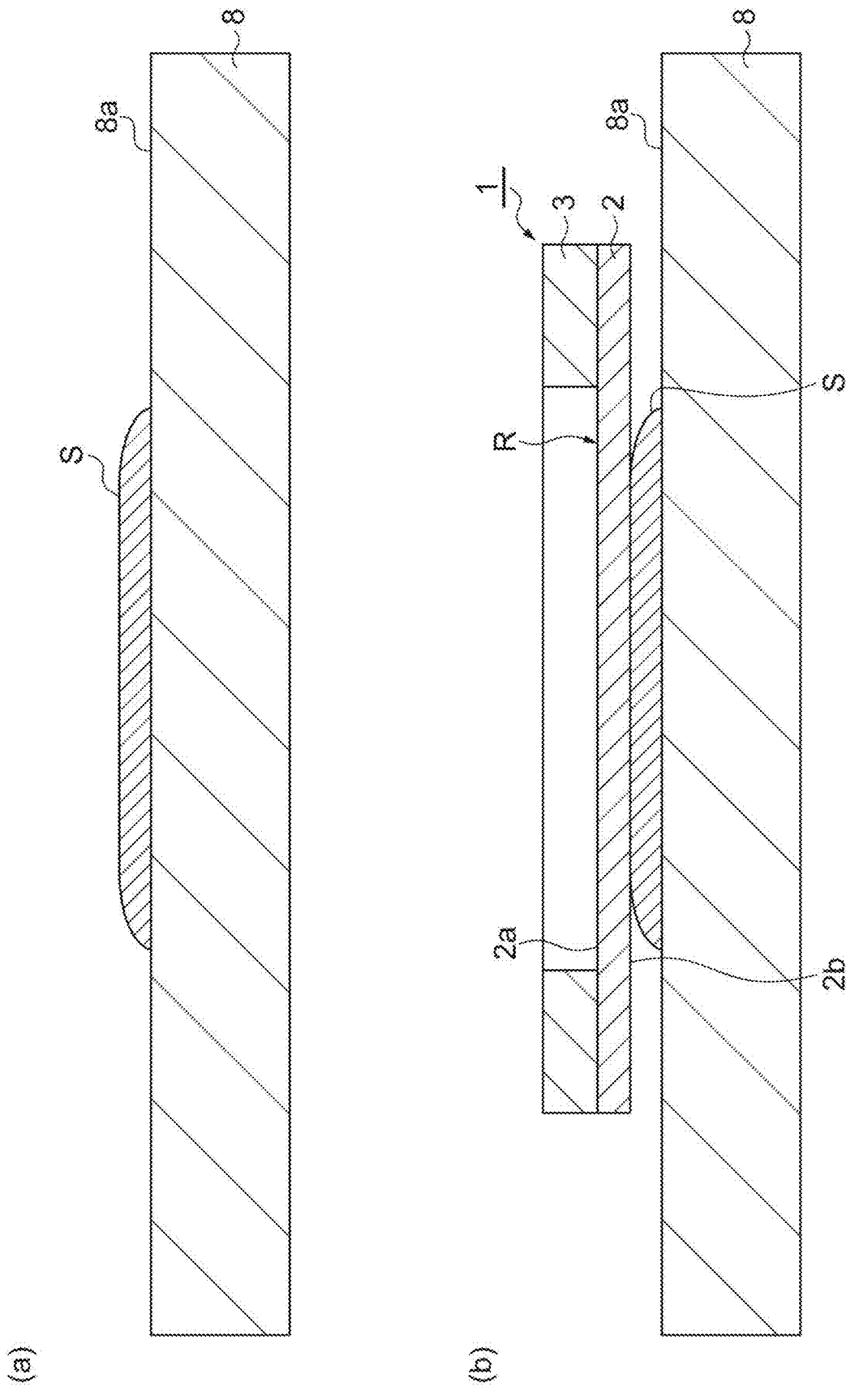
FIG. 9 is a view illustrating a process of a mass spectrometry method of a sucking method.
Figure 10:
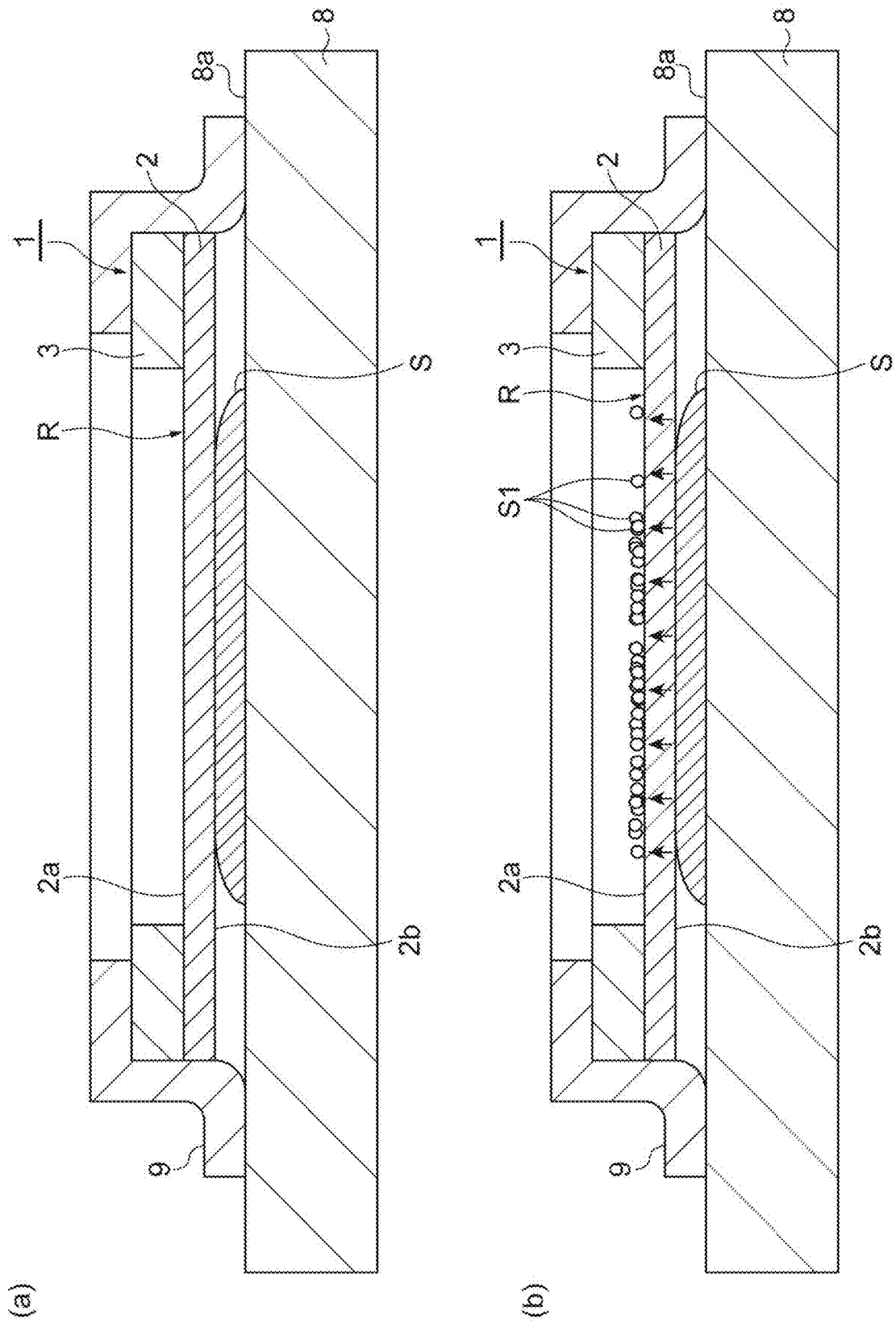
FIG. 10 is a view illustrating a process of the mass spectrometry method of the sucking method.
Figure 11:
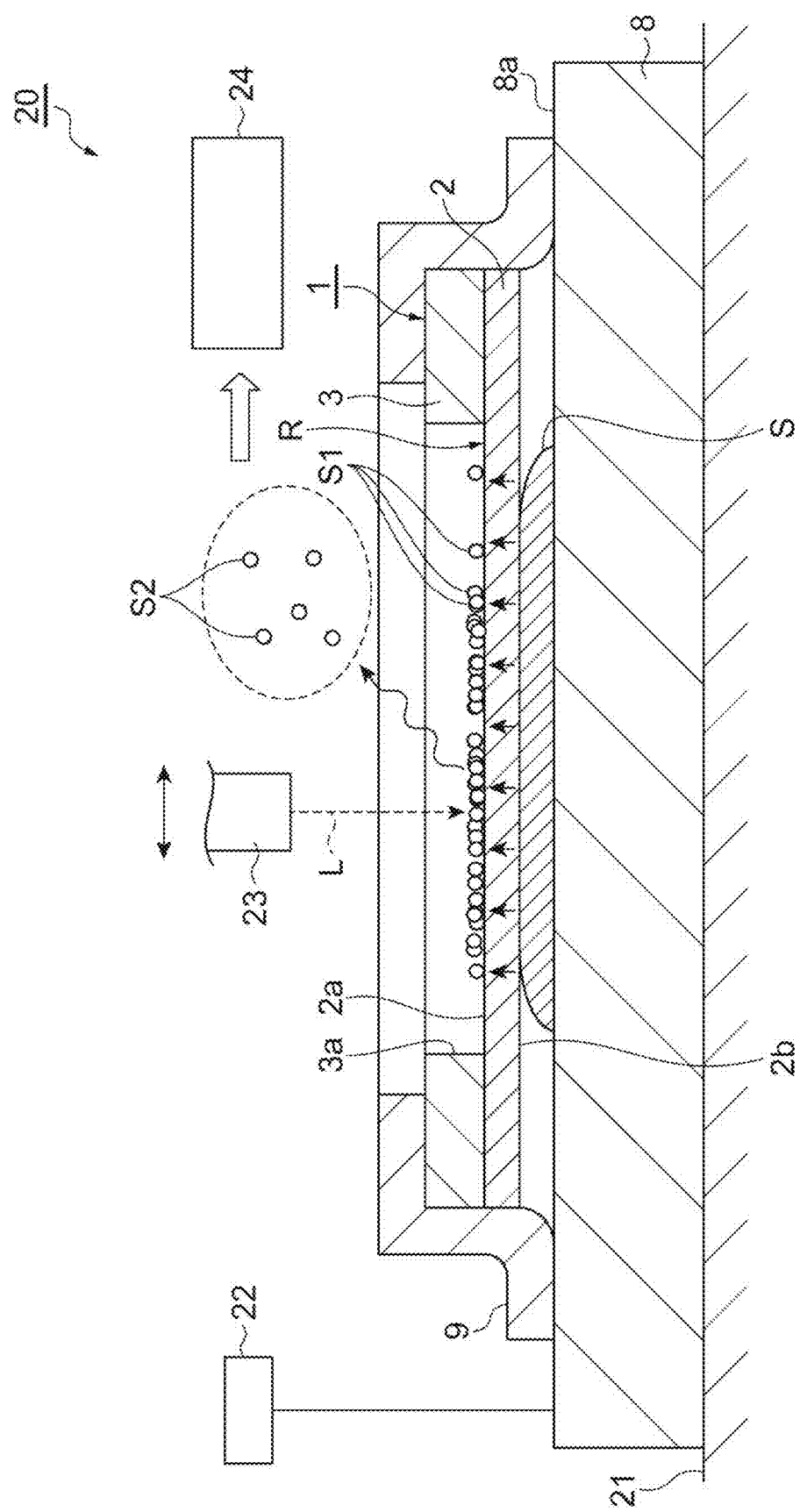
FIG. 11 is a view illustrating a process of the mass spectrometry method of the sucking method.

Next, a sample ionization method of a sucking method using the sample support body 1 will be described with reference to FIGS. 9 to 11. The sucking method is a measuring method that disposes the sample support body 1 on the sample S such that the second surface 2b of the sample support body 1 faces the sample S. The sample support body 1 can be used in the sample ionization method of this sucking method. Here, as an example, a laser desorption/ionization method (a part of a mass spectrometry method using a mass spectrometer 20) using a laser beam as an energy beam applied for ionization of a sample will be described. In FIGS. 9 to 11, the through-holes 2c, the conductive layer 4, the adhesive layer 5, and the protective film 6 are not illustrated in the sample support body 1. Further, for convenience of illustration, for instance ratios of dimensions are different in the sample support body 1 illustrated in FIGS. 1 and 2 and the sample support body 1 illustrated in FIGS. 9 to 11.

First, like the dropping method, the aforementioned sample support body 1A is prepared (a first step). Next, as illustrated in (a) of FIG. 9, the sample S is mounted on the mounting surface 8a of the slide glass 8. Next, as illustrated in (b) of FIG. 9, the sample support body 1 is disposed on the sample S such that the second surface 2b of the substrate 2 faces the sample S (a second step). That is, the sample support body 1 is disposed such that the second surface 2b is in contact with a surface (an upper surface) of the sample S via the protective film 6. In this state, as illustrated in (a) of FIG. 10, the sample support body 1 is fixed to the slide glass 8. In this case, when viewed in the thickness direction of the substrate 2, the sample S is disposed within the effective region R. Further, the sample support body 1 is fixed to the slide glass 8 by a tape 9. Here, the sample S is, for instance, a thin film-like biological sample (hydrous sample) such as a tissue section.

Next, as illustrated in (b) of FIG. 10, in a state in which the sample S is disposed between the slide glass 8 and the sample support body 1, components S1 of the sample S move to the side of the first surface 2a of the substrate 2 (the side of the third surface 4a of the conductive layer 4) via the plurality of through-holes 2c (see FIGS. 2 and 6) due to a capillary phenomenon. The components S1 moving to the side of the first surface 2a of the substrate 2 stay at the side of the first surface 2a due to surface tension. In a case where the sample S is a dry sample, a solution (e.g., an organic solvent such as acetonitrile, methanol, acetone, etc.) for reducing viscosity of the sample S is added to the sample S. Thus, the components S1 of the sample S can be made to move to the side of the first surface 2a of the substrate 2 via the plurality of through-holes 2c due to a capillary phenomenon.

Here, in the sample support body 1, the protective film 6 (see FIGS. 2 and 6) is provided, and thus circulation of the components S1 of the sample S from the openings of the through-holes 2c at the side of the second surface 2b into the through-holes 2c is accelerated. That is, the components S1 of the sample S is made to easily enter from the opening of each through-hole 2c at the side of the second surface 2b into each through-hole 2c along the protective film 6. That is, the protective film 6 serves to appropriately guide the components S1 of the sample S at the side of the second surface 2b into each through-hole 2c. Thus, the components S1 of the sample S can be made to appropriately enter into each through-hole 2c.

Next, as illustrated in FIG. 11, in a state in which the sample support body 1 where the components S1 of the sample S stay in each through-hole 2c is fixed to the slide glass 8, the slide glass 8, the sample support body 1, and the sample S are mounted on the support 21 of the mass spectrometer 20. Next, a voltage is applied to the conductive layer 4 (see FIG. 2) of the sample support body 1 via the mounting surface 8a of the slide glass 8 and the tape 9 by the voltage application part 22 of the mass spectrometer 20. In the present embodiment, the conductive layer 4 and the tape 9 are conducted at a portion at which the protective film 6 is not provided (a portion of the conductive layer 4 provided on the frame 3).

Next, a laser beam L is applied to the first surface 2a of the substrate 2 (the third surface 4a of the conductive layer 4) via an opening 3a of the frame 3 by the laser beam application part 23 of the mass spectrometer 20. That is, the laser beam L is applied to a region of the first surface 2a of the substrate 2 (i.e., a region corresponding to the effective region R) which corresponds to the opening 3a of the frame 3. In the present embodiment, the laser beam application part 23 scans the laser beam L onto the region corresponding to the effective region R.

In this way, the laser beam L is applied to the first surface 2a of the substrate 2 while a voltage is applied to the conductive layer 4. Thus, the components S1 of the sample S which stay in the through-holes 2c of the substrate 2 (especially, at the side of the first surface 2a) are ionized, and sample ions S2 (the ionized components S1) are discharged (a third step). To be specific, energy of the laser beam L is transmitted from the conductive layer 4 (see FIG. 2) absorbing the energy of the laser beam L to the components S1 of the sample S which stay in the through-holes 2c, and the components S1 of the sample S which obtain the energy are evaporated, and obtain electric charges to become the sample ions S2. The above first to fourth steps are equivalent to the ionization method (here, the laser desorption/ionization method) of the sample S using the sample support body 1.

The discharged sample ions S2 move while being accelerated toward a ground electrode (not illustrated) provided between the sample support body 1 and the ion detector 24 of the mass spectrometer 20. That is, the sample ions S2 move while being accelerated toward the ground electrode by a potential difference generated between the conductive layer 4 to which a voltage is applied and the ground electrode. The sample ions S2 are detected by the ion detector 24 (a fifth step). In the present embodiment, the mass spectrometer 20 is a scanning mass spectrometer using time-of-flight mass spectrometry (TOF-MS). The above first to fifth steps are equivalent to the mass spectrometry method using the sample support body 1.

Operation and Effects of the First Embodiment

As described above, the sample support body 1 includes the substrate 2 in which the plurality of through-holes 2c opening to the second surface 2b and the third surface 4a are formed. For example, in a state in which the components S1 of the sample S to be measured enter the plurality of through-holes 2c of the substrate 2 due to a capillary phenomenon, the laser beam is applied to the first surface 2a of the substrate 2. Thus, the energy of the laser beam is transmitted to the components S1 of the sample S via the conductive layer 4, and the components S1 of the sample S are ionized. Here, from intensive research of the inventors of the disclosure, the knowledge has been obtained that the signal intensity of the ionized sample (the sample ions S2) is increased by leaving as much of the components S1 of the sample S in the through-holes 2c as possible. Therefore, in the sample support body 1, the protective film 6 having a higher affinity with water than the substrate 2 is provided on the second surface 2b of the substrate 2, the third surface 4a of the conductive layer 4, and each inner surface of the plurality of through-holes 2c. This protective film 6 is provided, and thus the circulation of the components S1 of the sample S from the openings of the through-holes 2c at the side of the second surface 2b and the openings of the through-holes 2c at the side of the third surface 4a into the through-holes 2c can be accelerated, and the components S1 of the sample S can easily enter the through-holes 2c. As a result, the components S1 of the sample S can be easily left in the through-holes 2c, and the signal intensity of the sample ions S2 can be improved.

Further, the protective film 6 is formed by forming a film of titanium oxide or zinc oxide. In this case, the hydrophilic protective film 6 capable of accelerating the circulation of the components S1 of the sample S into the through-holes 2c is appropriately realized.

Further, the substrate 2 is formed by anodizing a valve metal or silicon. In this case, movement of the components S1 of the sample S due to a capillary phenomenon can be appropriately realized by the substrate 2 obtained by anodizing a valve metal or silicon.

Further, widths of the through-holes 2c are 1 nm to 700 nm. In this case, the movement of the components S1 of the sample S due to the aforementioned capillary phenomenon can be appropriately realized.

Further, a material of the conductive layer 4 is platinum or gold. In this case, a constant voltage can be easily and stably applied to the conductive layer 4.

Further, according to the production method for the aforementioned sample support body 1, the sample support body 1 can be appropriately obtained. Further, in the second step in the production method for the sample support body 1, the protective film 6 is formed by forming the film of titanium oxide or zinc oxide using an atomic layer deposition method. Thus, the hydrophilic protective film 6 capable of accelerating the circulation of the components S1 of the sample S into the through-holes 2c can be appropriately and easily formed.

Second Embodiment (a) of FIG. 12 is an enlarged sectional view of a portion corresponding to an effective region R of a sample support body 1A according to a second embodiment. As illustrated in (a) of FIG. 12, the sample support body 1A is different from the sample support body 1 in that a conductive layer 4 is omitted, and the sample support body 1A includes a protective film 6A provided on a first surface 2a, a second surface 2b, and each inner surface of a plurality of through-holes 2c. The protective film 6A is formed of a material having conductivity. To be specific, the protective film 6A is formed by forming a film of conductive titanium oxide or conductive zinc oxide. The protective film 6A combines functions of both the conductive layer 4 and the protective film 6 in the aforementioned sample support body 1.

Next, a production method for the sample support body 1A will be described. First, the substrate 2 formed with the plurality of through-holes 2c opening to the first and second surfaces 2a and 2b opposite to each other is prepared (a first step). Next, the frame 3 is fixed to the first surface 2a of the substrate 2 via the adhesive layer 5. Next, as illustrated in (a) of FIG. 12, the film of conductive titanium oxide or conductive zinc oxide is formed on the first surface 2a, the second surface 2b, and each inner surface of the plurality of through-holes 2c, for instance, by an atomic layer deposition method, and thus the protective film 6A is provided (a second step). From the above, the aforementioned sample support body 1A is obtained.

In the sample support body 1A, the protective film 6A formed of conductive titanium oxide or conductive zinc oxide exhibits functions of both the conductive layer 4 and the protective film 6 in the aforementioned sample support body 1. Therefore, according to the sample support body 1A, the same effects as for the aforementioned sample support body 1 can be produced, and a configuration of the sample support body can be simplified by omitting the conductive layer 4.

Third Embodiment (b) of FIG. 12 is an enlarged sectional view of a portion corresponding to an effective region R of a sample support body 1B according to a third embodiment. As illustrated in (b) of FIG. 12, the sample support body 1B is different from the sample support body 1 in that the sample support body 1B includes a substrate 2A having conductivity and a conductive layer 4 is omitted (in that a conductive layer 4 is omitted, and thus the sample support body 1B includes a protective film 6B that is provided at a position partly different from that of the protective film 6). The substrate 2A is different from the substrate 2 in that the substrate 2A has conductivity, and is the same as the substrate 2 in regard to the configuration otherwise. The substrate 2A is formed, for instance, by anodizing silicon. Further, the protective film 6B is different from the protective film 6 in that the protective film 6B is provided on a first surface 2a, a second surface 2b, and each inner surface of a plurality of through-holes 2c. The same materials as for the protective film 6 can be used as a material of the protective film 6B.

Next, a production method for the sample support body 1B will be described. First, the substrate 2A formed with the plurality of through-holes 2c opening to the first and second surfaces 2a and 2b opposite to each other is prepared (a first step). Next, the frame 3 is fixed to the first surface 2a of the substrate 2 via the adhesive layer 5. Next, as illustrated in (b) of FIG. 12, the film of conductive titanium oxide or conductive zinc oxide is formed on the first surface 2a, the second surface 2b, and each inner surface of the plurality of through-holes 2c, for instance, by an atomic layer deposition method, and thus the protective film 6B is provided (a second step). From the above, the aforementioned sample support body 1B is obtained.

In the sample support body 1B, the substrate 2A having conductivity is adopted, and thus the conductive layer 4 of the sample support body 1 is omitted. Therefore, according to the sample support body 1B, the same effects as the aforementioned sample support body 1 can be produced, and a configuration of the sample support body can be simplified by omitting the conductive layer 4.

While the embodiments of the present disclosure have been described, the present disclosure is not limited to the above embodiments, and can be variously modified without departing from the spirit and scope of the present disclosure.

For example, if the conductive layer 4 is provided on at least the first surface 2a of the substrate 2, the conductive layer 4 may not be provided on the second surface 2b of the substrate 2 and the inner surfaces of the through-holes 2c, or may be provided on the second surface 2b of the substrate 2 and the inner surfaces of the through-holes 2c. In a case where the conductive layer 4 is also provided on the inner surfaces of the through-holes 2c, the aforementioned protective film 6 may be provided to cover the conductive layer 4 provided on the inner surfaces of the through-holes 2c. Further, in the sample ionization method using the aforementioned sample support body 1, the sample support body 1 may be fixed to the slide glass 8 by a means other than the tape 9 (e.g., a means using an adhesive, a fixture, or the like).

Further, in the mass spectrometer 20, the laser beam application part 23 may apply the laser beam L to the region corresponding to the effective region R in block, and the ion detector 24 may detect the sample ions S2 while maintaining two-dimensional information of the region. That is, the mass spectrometer 20 may be a projection type mass spectrometer. Further, the aforementioned sample ionization method can be used in the mass spectrometry (including the imaging mass spectrometry) of the molecules of which the sample S is composed as well as other measurement such as ion mobility measurement and other experiments.

Further, use of the sample support body 1, 1A, or 1B is not limited to the ionization of the sample S caused by the application of the laser beam L. The sample support body 1, 1A, or 1B may be used for the ionization of the sample S caused by the application of an energy beam (e.g., an ion beam, an electron beam, or the like) other than the laser beam L.

Further, in the aforementioned embodiments, one effective region R is provided on the substrate 2, but a plurality of effective regions R may be provided on the substrate 2. Further, the plurality of through-holes 2c need not be formed only in the effective region R and, as in the aforementioned embodiments, the plurality of through-holes 2c may be formed, for instance, in the entire substrate 2. That is, the plurality of through-holes 2c may be formed in at least the effective region R. Further, in the aforementioned embodiments, the sample S is disposed such that one sample S corresponds to one effective region R, but a plurality of samples S may be disposed such that the plurality of samples S correspond to one effective region R.

REFERENCE SIGNS LIST 1, 1A, 1B Sample support body
2, 2A Substrate
2a First surface
2b Second surface
2c Through-hole
4 Conductive layer
4a Third surface
6, 6A, 6B Protective film

The invention claimed is:

1. A sample support body for ionization of a sample comprising:
a substrate having a first surface and a second surface opposite to each other; and
a conductive layer provided on at least the first surface,
wherein a plurality of through-holes, which open to the second surface and a third surface of the conductive layer which is located at a side opposite to the substrate, are formed in the substrate and the conductive layer, and
a protective film having a higher affinity with water than the substrate is provided on the second surface, the third surface, and each inner surface of the plurality of through-holes.

2. The sample support body according to claim 1, wherein the protective film is formed by forming a film of titanium oxide or zinc oxide.

3. The sample support body according to claim 1, wherein the substrate is formed by anodizing a valve metal or silicon.

4. The sample support body according to claim 1, wherein widths of the through-holes are 1 nm to 700 nm.

5. The sample support body according to claim 1, wherein a material of the conductive layer is platinum or gold.

6. A sample support body for ionization of a sample comprising:
a substrate formed with a plurality of through-holes opening to a first surface and a second surface opposite to each other; and
a protective film provided on the first surface, the second surface, and each inner surface of the plurality of through-holes,
wherein the protective film is formed by forming a film of conductive titanium oxide or conductive zinc oxide.

7. A sample support body for ionization of a sample comprising:
a substrate which has conductivity and is formed with a plurality of through-holes opening to a first surface and a second surface opposite to each other,
wherein a protective film having a higher affinity with water than the substrate is provided on the first surface, the second surface, and each inner surface of the plurality of through-holes.

8. A production method for a sample support body for ionization of a sample comprising:
a first step of preparing a substrate having a first surface and a second surface opposite to each other and a conductive layer provided on at least the first surface, wherein a plurality of through-holes, which open to the second surface and a third surface of the conductive layer which is located at a side opposite to the substrate, are formed in the substrate and the conductive layer; and a second step of providing a protective film having a higher affinity with water than the substrate on the second surface, the third surface, and each inner surface of the plurality of through-holes.

9. The production method according to claim 8, wherein the protective film is formed by forming a film of titanium oxide or zinc oxide using an atomic layer deposition method.

10. A production method for a sample support body for ionization of a sample comprising:

a first step of preparing a substrate formed with a plurality of through-holes opening to a first surface and a second surface opposite to each other; and a second step of providing a protective film on the first surface, the second surface, and each inner surface of the plurality of through-holes by forming a film of conductive titanium oxide or conductive zinc oxide.

11. A production method for a sample support body for ionization of a sample comprising:

a first step of preparing a substrate which has conductivity and is formed with a plurality of through-holes opening to a first surface and a second surface opposite to each other; and a second step of providing a protective film having a higher affinity with water than the substrate on the first surface, the second surface, and each inner surface of the plurality of through-holes.

\* \* \* \* \*